Oct. 14, 1924.
H. P. WESTERBERG
SAFETY PIN
Filed Oct. 22, 1923
1,511,926
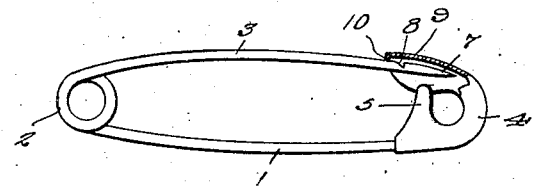
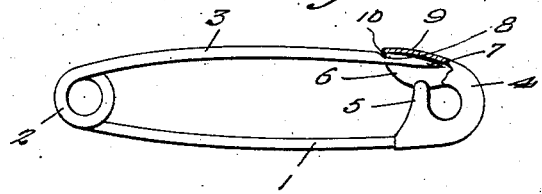
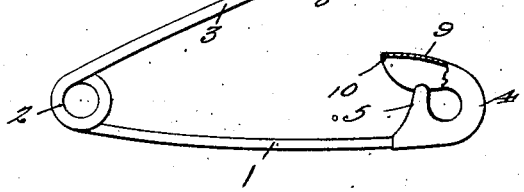
H. P. Westerberg INVENTOR
BY Victor J. Evans ATTORNEY
WITNESSES Patented Oct. 14, 1924.

1,511,926

UNITED STATES PATENT OFFICE.

HERMAN P. WESTERBERG, OF SIMSBURY, CONNECTICUT.

SAFETY PIN.

Application filed October 22, 1923. Serial No. 670,152.

*To all whom it may concern:*

Be it known that I, HERMAN P. WESTERBERG, a citizen of the United States, residing at Simsbury, in the county of Hartford and State of Connecticut, have invented new and useful Improvements in Safety Pins, of which the following is a specification.

The object of my said invention is the provision of a safety pin which without being more expensive than an ordinary safety pin is adapted to effectually prevent casual opening of the pin when the same is subjected to undue strain.

To the attainment of the foregoing, the invention consists in the improvement as hereinafter described and definitely claimed.

In the accompanying drawings, forming part of this specification:—

Figure 1 is a view partly in side elevation and partly in longitudinal section of a safety pin embodying my invention, the said safety pin being shown as the same appears when closed and when not subjected to undue strain.

Figure 2 is a similar view showing the pin as the same appears when the pin is subjected to undue strain.

Figure 3 is a similar view showing the pin in open state.

Similar numerals of reference designate corresponding parts in all of the views of drawings.

Among other elements my novel safety pin comprises the usual body bar 1, with a spring coil 2 at one end thereof, a pin proper 3 integral with the said spring coil, and a combined keeper and housing 4 for the point of the pin proper 3. The said combined housing and guard is provided with the usual tongue 5 and with the usual portion 6 of inverted U-shape in cross-section.

In accordance with my invention, the pin proper 3 is provided adjacent to, though spaced from, its point 7 with a notch 8, and also in accordance with my invention the U-shaped portion 6 of the combined housing and keeper 4 is provided at the inner end of its body portion 9 with a catch 10, the said catch 10 being directed inwardly or toward the body bar 1 as illustrated.

As will be readily understood from Figure 1, the notch 8 and the catch 10 are idle when the safety pin is used in the ordinary well known manner and while closed as not subjected to undue strain. When, however, the safety pin is subjected to great strain the notch 8 and the catch 10 will cooperate after the manner clearly shown in Figure 2 to preclude the possibility of the pin casually or accidentally opening under the undue strain alluded to.

Figure 3 of the drawings shows the safety pin as open in the well known manner and makes manifest the fact that my novel notch 8 and catch 10 do not interfere in any degree with the ordinary closing and opening of the safety pin.

It will also be manifest from the foregoing that my novel notch 8 and catch 10 do not materially increase the cost of production of the improved safety pin as compared with an ordinary safety pin.

Having described my invention, what I claim and desire to secure by Letters-Patent, is:—

As a new article of manufacture, a safety pin comprising a body bar, a pin proper connected by spring means with one end of said body bar and having a point and a notch in the outer side of the pin proper and in spaced relation to said point, and a combined keeper and housing carried by the body bar and having a U-shaped portion with an outer bight to receive and guard the point portion of the pin proper and also having an inwardly directed catch at the end of the said outer bight adjacent to the spring means to seat in the notch of the pin proper and hold said pin proper when the safety pin is subjected to undue strain.

In testimony whereof I affix my signature.

HERMAN P. WESTERBERG.